(12) United States Patent
Leimbach et al.

(10) Patent No.: US 6,311,111 B1
(45) Date of Patent: Oct. 30, 2001

(54) METHOD AND DEVICE FOR DETECTING MOTOR VEHICLE TILT

(75) Inventors: Klaus-Dieter Leimbach, Moeglingen; Gabriel Wetzel, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,135
(22) PCT Filed: Jul. 1, 1998
(86) PCT No.: PCT/DE98/01805
  § 371 Date: Oct. 13, 1999
  § 102(e) Date: Oct. 13, 1999
(87) PCT Pub. No.: WO99/26811
  PCT Pub. Date: Jun. 3, 1999

(30) Foreign Application Priority Data

Nov. 22, 1997 (DE) .............................................. 197 51 867

(51) Int. Cl.[7] .................................................. B60R 16/02
(52) U.S. Cl. ................................. 701/38; 701/48; 180/282
(58) Field of Search ................................. 701/37, 38, 48, 701/72; 180/282; 280/5.502, 5.506, 5.507; 340/440

(56) References Cited

U.S. PATENT DOCUMENTS

| 3,609,313 | 9/1971 | Lucien . |
| 4,023,864 | 5/1977 | Lang et al. . |
| 4,386,674 | 6/1983 | Sugata . |
| 4,964,679 | 10/1990 | Rath . |
| 5,446,658 | 8/1995 | Pastor et al. . |
| 5,471,386 | 11/1995 | Hrovat et al. . |

FOREIGN PATENT DOCUMENTS

| 32 22 149 | 11/1983 | (DE) . |
| 42 28 893 | 3/1994 | (DE) . |
| 43 42 732 | 6/1995 | (DE) . |
| 44 16 991 | 11/1995 | (DE) . |
| 196 32 943 | 2/1998 | (DE) . |
| 0 330 149 | 8/1989 | (EP) . |
| 2 425 342 | 12/1979 | (FR) . |
| 2 257 403 | 1/1993 | (GB) . |
| 01 101238 | 4/1989 | (JP) . |
| WO 97 28017 | 8/1997 | (WO) . |

OTHER PUBLICATIONS

Zanten et al., *FDR–Die Fahrdynamik–Regelung Von Bosch*, ATZ Automobiltechnische Zeitschrift., vol. 96, No. 11, pp. 674–689 (Nov. 1994).

Limpert Leiber, *Der Elektronische Bremsregler*, ATZ Automobiltechnische Zeitschrift., vol. 71, No. 6, pp. 181–189 (Jun. 1969).

*Primary Examiner*—Michael J. Zanelli
(74) *Attorney, Agent, or Firm*—Kenyon & Kenyon

(57) ABSTRACT

A method and a device serve to detect a tendency of a vehicle to roll over about a vehicle axis oriented in the longitudinal direction of the vehicle. To do so, a variable describing the wheel rpm is determined for at least one wheel. Furthermore, at least one variable representing the transverse dynamics of the vehicle is determined. For at least one wheel, a variable describing the wheel behavior quantitatively is determined at least as a function of the variable describing the wheel rpm of the corresponding wheel and one of the variables representing the transverse dynamics of the vehicle. Whether the vehicle has a tendency to roll over about a vehicle axis oriented in the longitudinal direction of the vehicle is determined at least as a function of the variable determined for at least one wheel, describing the wheel behavior of this wheel quantitatively. The method and the device for detecting a tendency of a vehicle to roll over about a vehicle axis oriented in the longitudinal direction of the vehicle are used in the context of stabilizing the vehicle.

17 Claims, 7 Drawing Sheets

METHOD AND DEVICE FOR DETECTING MOTOR VEHICLE TILT

FIELD OF THE INVENTION

The present invention relates to a method and a device for detecting the tendency of a vehicle to roll over.

BACKGROUND INFORMATION

Methods and devices for detecting the tendency of a vehicle to roll over are known in various modifications from the related art.

German Patent No. 44 16 991 describes a method and a device for warning the driver of a truck of the risk of roll over when turning a corner. To do so, the type of vehicle and the relevant status data for the risk of roll over are determined before the vehicle enters the turn, and the risk of roll over or the critical speed limit for the latter is determined as a function of the radius of the curve and the center of gravity of the vehicle. A signal prompting the driver to reduce his speed is triggered when the prevailing road speed of the vehicle is the reason for the risk of roll over or a predetermined safety margin from the risk of roll over is no longer met. The vehicle's road speed at which there is with certainty no risk of roll over is determined on the basis of a roll-over equation. The roll-over equation includes the vehicle speed, the curve radius traveled by the vehicle, the height of the vehicle's center of gravity above the road surface and the wheel load imbalance. The wheel loads are determined with the help of wheel load sensors embedded in the road surface. If the road speed of the vehicle no longer meets a predetermined safety margin from the road speed at the limit of the risk of roll over, a signal is generated, warning the driver of the vehicle of excessive speed in turning the curve. The signal indicating excessive speed is triggered until the measured road speed has been reduced to an extent that rules out any risk of roll over. Furthermore, German Patent No. 44 16 991 shows that the wheel slip of the vehicle's wheels on the road surface can be determined and taken into account in evaluating the risk of roll over.

An object of the present invention is to improve upon the method and the device detecting the tendency of a vehicle to roll over.

SUMMARY OF THE INVENTION

A tendency of a vehicle to roll over about a vehicle axis oriented in the longitudinal direction of the vehicle is detected using a method according to the present invention. For this, a variable describing the wheel rpm is determined for at least one wheel. Furthermore, at least one variable representing the transverse dynamics of the vehicle is determined. A variable describing wheel behavior quantitatively is determined for at least one wheel at least as a function of the variable describing the wheel rpm of the corresponding wheel and one of the variables representing the transverse dynamics of the vehicle. Whether the vehicle has a tendency to roll over about a vehicle axis oriented in the longitudinal direction of the vehicle is determined at least as a function of the variable determined for the minimum of one wheel, describing the wheel behavior of this wheel quantitatively.

It should be pointed out here that when the "tendency of a vehicle to roll over" is used below, this refers to the "tendency of a vehicle to roll over about a vehicle axis oriented in the longitudinal direction of the vehicle." The formulation "a vehicle axis oriented in the longitudinal direction of the vehicle" is to be understood as follows: first, the vehicle axis about which the vehicle has a tendency to roll over may be the actual longitudinal axis of the vehicle. Second, it may be a vehicle axis which is twisted by a certain angle with respect to the actual longitudinal axis of the vehicle. It does not matter here whether or not the twisted vehicle axis passes through the center of gravity of the vehicle. The case of the twisted vehicle axis should also permit an orientation of the vehicle axis such that the vehicle axis corresponds either to a diagonal axis of the vehicle or to an axis parallel to it.

Determination of a variable describing the wheel behavior quantitatively and as a function of which it is determined whether the vehicle has a tendency to roll over is the reason for the following advantage in comparison with the related art: since a tendency of a vehicle to roll over about a vehicle axis oriented in the longitudinal direction of the vehicle is reflected directly in the wheel behavior of the wheels of the vehicle, it is possible to determine quickly and accurately whether the vehicle has a tendency to roll over by using the method according to the present invention on the basis of analysis of a variable describing the wheel behavior quantitatively. It can be done quickly because a variable describing the wheel behavior quantitatively enters directly into the determination of the roll-over tendency. It is accurate because multiple wheels can be analyzed to determine the roll-over tendency, and because the variables which describe the wheel behavior are available as quantitative values and thus, for example, precisely gradated plausibility queries are possible.

The method according to the present invention of detecting a tendency of the vehicle to roll over can be advantageous in the context of, for example, a method of stabilizing the vehicle. Such a method may be advantageous for a method of preventing the vehicle from rolling over, for example.

If the vehicle has a tendency to roll over, at least braking measures are advantageously implemented on at least one wheel and/or engine measures and/or measures involving the chassis actuators are taken to stabilize the vehicle, in particular, to prevent the vehicle from rolling over.

It has proven to be advantageous that the absolute value of one of the variables representing the transverse dynamics of the vehicle, in particular, the absolute value of the variable describing the transverse acceleration and/or the absolute value of a variable describing the yaw of the vehicle is compared with a threshold value. Then a determination of whether the vehicle has a tendency to roll over is performed when the absolute value of the one variable representing the transverse dynamics of the vehicle is greater than the threshold value. Therefore, the method according to the present invention is activated only in those transverse dynamic vehicle situations in which the vehicle can be expected to have a tendency to roll over.

It is also advantageous if the drive slip and/or wheel slip prevailing on a wheel is determined for at least that one wheel, and its absolute value is compared with a corresponding threshold value, and if the determination of whether the vehicle has a tendency to roll over is performed as a function of this comparison. Different determinations of the tendency of the vehicle to roll over are performed on the basis of this comparison. Thus, if for at least one wheel the absolute value of the drive slip and/or wheel slip prevailing on this wheel is smaller than the corresponding threshold value, the determination of whether the vehicle has a tendency to roll over is performed at least as a function of the variable describing the wheel behavior quantitatively and determined for the minimum of one wheel in the instantaneous time increment. However, if the absolute value of the drive slip and/or wheel slip determined for at least one wheel is greater than the corresponding threshold value, the determination of whether the vehicle has a tendency to roll over is performed at least as a function of the variable describing the wheel behavior quantitatively and determined for at least one wheel in a preceding time increment.

Advantageously, a variable depending on the wheel load acting on the respective wheel is determined as the variable describing the wheel behavior of the respective wheel quantitatively. Variables describing the diameter or radius of the respective wheel are particularly advantageous because a displacement in the center of gravity of the vehicle due to turning a corner has a significant effect on the diameter of the vehicle's wheels, for example, and thus a tendency of a vehicle to roll over can be detected directly on the basis of the vehicle's wheel diameter.

The variable describing the wheel behavior quantitatively is advantageously determined at least as a function of the variable describing the wheel rpm of the corresponding wheel, a variable describing the vehicle speed, a variable representing the transverse dynamics of the vehicle and a variable describing the vehicle geometry. The variable describing the vehicle speed is determined at least as a function of the variables determined for the wheels and describing the wheel rpm. A variable describing the transverse acceleration of the vehicle and/or the yaw of the vehicle is advantageously determined as a variable representing the transverse dynamics of the vehicle.

The following criteria have proven advantageous in determining whether the vehicle has a tendency to roll over about a vehicle axis oriented in the longitudinal direction of the vehicle. A vehicle has a tendency to roll over:

When, for at least one wheel, the value of the variable describing the wheel behavior quantitatively is greater than a first threshold value. Or when, for at least one wheel, the value of the variable describing the wheel behavior quantitatively is smaller than a second threshold value.

Roll over of a vehicle is thus associated with the fact that at the forefront of the roll over, some of the wheels are under a greater load in comparison with the normal condition when driving straight ahead and some of the wheels are under a lesser load accordingly. Both factors lead to a change in the wheel diameter, which can be analyzed to detect a tendency to roll over. Thus, the first query determines which wheels have a reduced load, i.e., are at risk of lifting. The second query determines which wheels are under a greater load, i.e., are being compressed.

When, for at least one wheel, the absolute value of a difference derived from the value of the variable describing the wheel behavior quantitatively and a comparison value is greater than a corresponding threshold value.

With the help of this query, the instantaneous wheel behavior can be compared with the wheel behavior when driving straight ahead, for example. A tendency of the vehicle to roll over can be deduced from this comparison.

When for at least one wheel the absolute value of a variable describing the time characteristic of the variable describing the wheel behavior quantitatively is lower than a corresponding threshold value.

When the absolute value of a variable describing the angle of inclination of a wheel axle is greater than a corresponding threshold value. The variable describing the angle of inclination of a wheel axle is advantageously determined as a function of the variables determined for the wheels of the corresponding wheel axle and describing the wheel behavior quantitatively.

The queries described above are combined to yield a first type of query with the help of which a tendency of a vehicle to roll over about a vehicle axis oriented in the longitudinal direction of the vehicle can be determined. In addition to this first type of query, a second type is also used. The type of query used to determine the tendency to roll over is advantageously selected with the help of the comparison described above, which is based on the drive slip and/or wheel slip determined for at least one wheel.

The following is advantageously suggested for the second type of query: The absolute value of a difference formed from a variable describing the vehicle speed and a speed limit value is compared with a corresponding threshold value. If the absolute value of the difference is smaller than the corresponding threshold value, then the vehicle has a tendency to roll over. The speed limit value is advantageously determined at least as a function of a variable describing the height of the center of gravity of the vehicle, the latter being determined at least as a function of the variable determined for at least one wheel and describing the wheel behavior quantitatively.

It should be pointed out that blocks with the same designation in different figures have the same function.

DETAILED DESCRIPTION

Figure 1A:
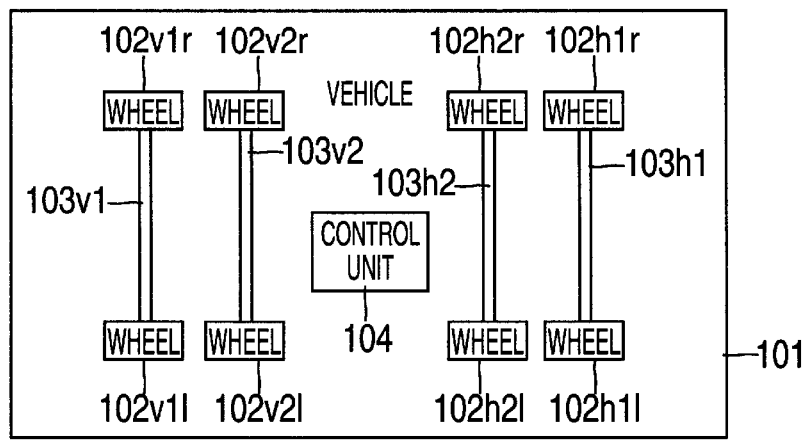
FIG. 1a shows a one-piece vehicle for which a method according to the present invention may be used.
Figure 1B:
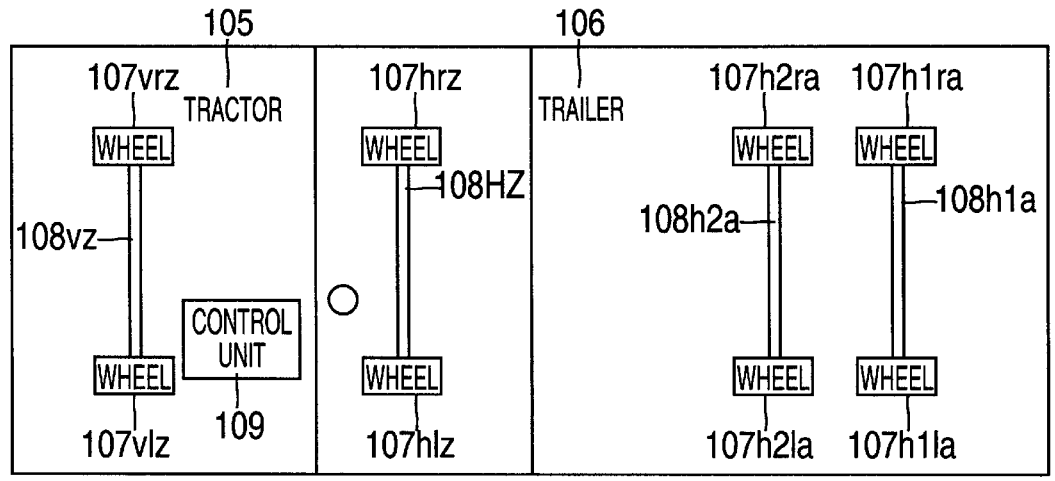
FIG. 1b shows a vehicle combination for which the method according to the present invention may be used.
Figure 1C:
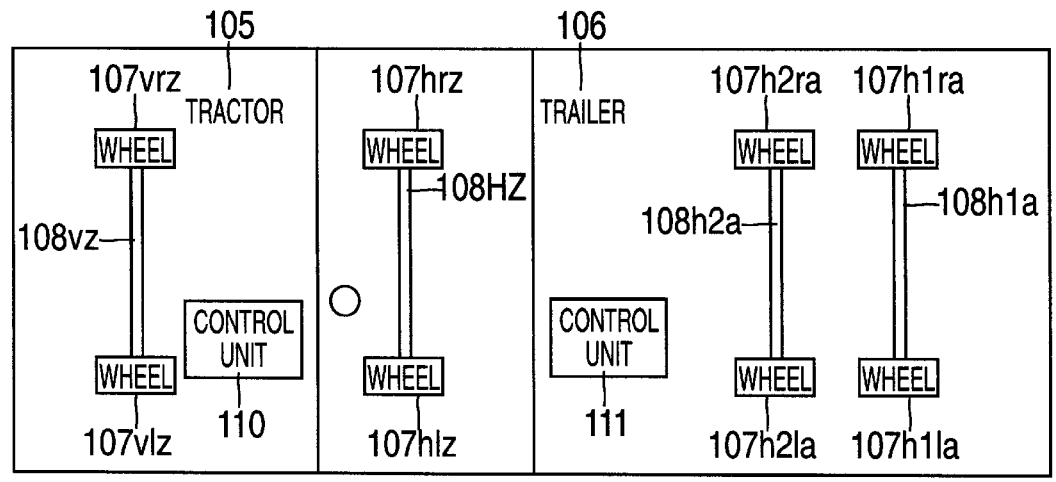
FIG. 1c shows the vehicle combination with two control devices for which the method according to the present invention may be used.

First, FIGS. 1a, 1b and 1c show the various road vehicles in which the method according to the present invention can be used.

FIG. 1a shows a one-piece vehicle 101 according to the present invention. This vehicle may be a passenger vehicle or a commercial vehicle. One-piece vehicle 101 shown in FIG. 1a is a vehicle with at least two wheel axles, which are indicated by the dotted lines in part of the diagram. The wheel axles of vehicle 101 are labeled as 103ix. Index i indicates whether it is a front axle (v) or a rear axle (h). For vehicles with more than two axles, index x indicates which of the front or rear axles are involved. The following assignment of values holds: The front and/or rear axle closest to the edge of the vehicle is assigned index x with the smallest value. The farther the respective wheel axle from the edge of the vehicle, the greater the value of respective index x. Wheels 102ixj are assigned to wheel axles 103ix. The meaning of indices i and x corresponds to that described above. Index j indicates whether the wheel is on the right (r) or left (1) side of the vehicle. In the diagram of wheels 102ixj, no distinction has been made between single wheels and dual wheels. Furthermore, vehicle 101 has a control unit 104 in which the device according to the present invention for carrying out the method according to the present invention is implemented.

To illustrate the diagram shown in FIG. 1a, it should be pointed out, for example, that a vehicle has a front axle 103v1 with wheels 102v1r and 102v1l assigned to it and a rear axle 103h1 with wheels 102h1r and 102h1l assigned to it. A triple-axle vehicle will normally have a front axle 103v1 with wheels 102v1r and 102v1l and a first rear axle 103h1 with wheels 102h1r and 102h1l and a second rear axle 103h2 with wheels 102h2r and 102h2l.

FIG. 1b shows a vehicle combination according to the present invention with a tractor 105 and a trailer 106. The diagram given here should not restrict the scope of the present invention in any way; for example, a vehicle combination consisting of a tractor and draw-bar trailer is also contemplated by the present invention. Tractor 105 has wheel axles 108iz. Wheel axles 108iz have corresponding wheels 107ijz. The meaning of indices i and j corresponds to that already described in conjunction with FIG. 1a. Index z indicates that these are wheels or wheel axles belonging to the tractor 105. Furthermore, tractor 105 has a control unit 109 with which a tendency of tractor 105 and/or trailer 106 and/or the entire vehicle combination to roll over about a vehicle axis oriented in the longitudinal direction of the vehicle is detected. Trailer 106 has two wheel axles 108ixa. Similarly, wheels 107ixja are assigned to two wheel axles 108ixa. The meaning of indices i and x and j corresponds to that already described in conjunction with FIG. 1a. Index a indicates that it is a component of trailer 106. The number of wheel axles for tractor 105 or for trailer 106 shown in FIG. 1b should not restrict the scope of the present invention in any way. Control unit 109 may also be arranged in trailer 106 instead of in tractor 105.

FIG. 1c shows a vehicle combination according to the present invention corresponding to the vehicle combination shown in FIG. 1b. For this reason, the tractor, trailer, wheel axles and wheels are labeled with the same reference notation. A difference between FIG. 1c and FIG. 1b is that the vehicle combination shown in FIG. 1c has two control units. Tractor 105 is assigned a control unit 110 according to the present invention. A control unit 111 according to the present invention is assigned to trailer 106. A method of detecting a tendency to roll over is run in both control units.

The characterization by indices a, i, j, x and z used in FIGS. 1a, 1b and 1c is the same for all the variables and components with which they are used.

On the basis of FIGS. 2a, 2b and 2c, three embodiments are discussed below which are based on the different vehicles illustrated in FIGS. 1a, 1b and 1c. The device according to the present invention which is implemented in the respective control unit 104 for vehicle 101 shown in FIG. 1a is described with reference to FIG. 2a. The device according to the present invention which is implemented in the respective control unit 109 for the vehicle combination shown in FIG. 1b is described with reference to FIG. 2b. With the vehicle combination illustrated in FIG. 1c, tractor 105 has its own control unit 110, and trailer 106 has its own control unit 111. The interaction of the two control units 110 and 111 is described on the basis of FIG. 2c.

The first embodiment will be described with the help of FIG. 2a.

The vehicle on which the first embodiment is based is a one-piece vehicle, as shown in FIG. 1a. Furthermore, it is assumed that this one-piece vehicle has at least two wheel axles 103ix. These two wheel axles are front axle 103v1 with wheels 102v1r and 102v1l and rear axle 103h1 with wheels 102h1r and 102h1l. Wheel rpm sensors 201v1r, 201v1l, 201h1r and 201h1l assigned to these wheels are shown in FIG. 2a. Depending on the number of wheel axles on the one-piece vehicle, additional wheel rpm sensors 201ixj may also be taken into account, as indicated in FIG. 2a. Variables nixj describing the wheel rpm of corresponding wheel 102ixj are determined with wheel rpm sensors 201ixj. Variables nixj are sent to blocks 204, 205 and 208.

Furthermore, it is assumed that vehicle 101 has a transverse acceleration sensor 202 and a yaw sensor 203. It should be pointed out here that the use of transverse acceleration sensor 202 and yaw sensor 203 is not intended to restrict the scope of the present invention in any way. For example, instead of determining a variable aq describing the transverse acceleration with the help of a transverse acceleration sensor, this variable may also be determined on the basis of variables nixj. Likewise, instead of determining a variable omega describing the yaw of the vehicle with the help of a yaw sensor 203, this variable may also be determined on the basis of variables nixj.

Variable aq describing the transverse acceleration of the vehicle determined with the help of transverse acceleration sensor 202 is sent to block 208 as well as to a block 206. Variable omega describing the yaw of the vehicle with the help of yaw sensor 203 is sent to blocks 208, 205 and 206.

A variable vf describing the vehicle speed is determined in block 204 in a known way from variables nixj. This variable vf is sent from block 204 to blocks 205 and 208. Furthermore, variables lambdaixj describing the drive slip and/or wheel slip of the wheels are determined in block 204 in a known way from variables nixj and variable vf. These variables lambdaixj are sent from block 204 to both block 206 and block 208.

Variables rixj describing the wheel behavior of the wheels quantitatively are determined in block 205 on the basis of variable vf, variables nixj and variable omega. These variables rixj depend on the wheel load acting on the respective wheel. In particular, variables rixj describe the dynamic running radii of the wheels which are determined using the equation:

$$rixj = \frac{vf \pm a \cdot \text{omega}}{nixj}$$

where variable a in the equation describes half the wheel base of the vehicle. The plus sign is used for the wheels on the outside of the curve and the minus sign for the wheels on the inside of the curve.

It should be pointed out here that variable omega used in the above equation describing the yaw of the vehicle can also be replaced by a term derived from the transverse acceleration of the vehicle and the vehicle speed. In this case, variable aq would have to be sent instead of variable omega to block 205.

Variables rixj describing the wheel behavior quantitatively, corresponding to the dynamic running radii of the wheels are sent from block 205 to block 206. Since variables rixj describing the wheel behavior quantitatively are the dynamic running radii, these variables describe the diameter and the corresponding radius of the respective wheel.

In block 206, it is determined whether the vehicle has a tendency to roll over about a vehicle axis oriented in the longitudinal direction of the vehicle on the basis of variables lambdaixj, aq, omega supplied to block 206 and variables mlix supplied to it as an alternative, describing the axle-specific load. To determine whether the vehicle has a tendency to roll over, various queries are performed in block 206 on the basis of the variables supplied to the block. These different queries are presented in FIGS. 3a and 3b which are yet to be described. If it is determined in block 206 that the vehicle does have a tendency to roll over about a vehicle axis oriented in the longitudinal direction of the vehicle, a variable KT is generated and sent from block 206 to block 208. With this variable KT, the controller or vehicle controller 208 is notified whether or not the vehicle has a tendency to roll over. In FIG. 2a, two components 205 and 206, which are contained in the control unit, 104 are combined in one block 207.

The controller or vehicle controller 208 which is implemented in control unit 104 is labeled as 208. Controller 208 may be, for example, a controller which in its basic function regulates a variable describing the drive dynamics of the vehicle, e.g., a variable depending on the transverse acceleration and/or yaw of the vehicle, and does so by measures affecting the wheel brakes and/or the engine. Such a controller is described, for example, in the article "FDR—die Fahrdynamikregelung von Bosch" published in the automotive engineering journal Automobiltechnische Zeitschrift (ATZ), vol. 16, no. 11 (1994) pages 674 through 689. The control taking place in its basic function in block 208 is based in a conventional manner on variables sent to block 208, namely nixj, aq, omega, vf, lambdaixj, a variable mot2 describing the engine rpm of engine 210, for example, sent from engine 210 to block 208, as well as variables ST2, sent to block 208 from a block 209, which is the control logic for the actuators present in the vehicle. It should be pointed out here that the control described above for the basic function of the controller is not intended to restrict the scope of the present invention in any way. As an alternative to this control, a wheel slip control which acts on the wheel brakes and/or a drive slip control which acts on the wheel brakes and/or the engine can also be implemented in controller 208 as its basic function.

In addition to the control implemented in block 208 in its basic function, a roll-over prevention is implemented in controller 208. This roll-over prevention can be more or less a higher priority than controlling the basic function. The roll-over prevention is executed on the basis of variables KT, which are generated in block 206 as part of the roll-over detection. With variables KT, controller 208 can be notified, for example, that the vehicle has a tendency to roll over about a vehicle axis oriented in the longitudinal direction of the vehicle; in addition, controller 208 can be notified how strong this roll-over tendency is. In addition, variables KT may contain information regarding how the vehicle is at risk of roll-over and to which wheels this risk applies.

Axle-specific wheel loads mlix are required in block 206 for this type of roll-over detection, which is performed in block 206. They are determined in controller 208 in a conventional manner, for example, from wheel rpm values and sent from block 208 to block 206.

Controller 208 generates variables ST1 which are sent to control logic 209 and with which the actuators provided for the vehicle are controlled. Variables ST1 notify control logic 209 which actuators are to be controlled. Variables ST1 are generated in controller 208 as follows, for example. If the vehicle has no tendency to roll over, variables ST1 are generated according to the control implemented for the basic function. In the case of the control described, for example, in the above-mentioned publication "FDR—drive dynamics control by Bosch," then variables ST1 contain information regarding which wheel(s) is/are to be braked and how and to what extent the engine torque delivered by the engine is to be influenced. If the vehicle has a tendency to roll over, then two procedures are contemplated by the present invention for forming variables ST1. First, variables ST1*, which have been determined according to the control concept implemented for the basic function, are modified so that roll-over of the vehicle about a vehicle axis oriented in the longitudinal direction of the vehicle is prevented. Second, variables ST1* determined according to the control concept implemented for the basic function can be replaced by variables generated to prevent the vehicle from rolling over.

The following measures affecting the actuators of the vehicle are contemplated by the present invention, for example, to prevent the vehicle from rolling over about a vehicle axis oriented in the longitudinal direction of the vehicle. First, the vehicle speed can be reduced by braking or by reducing engine torque. Second, roll-over of the vehicle can be counteracted in a controlled manner by braking measures taken for each wheel individually. Furthermore, a rolling motion of the vehicle can be limited by measures involving the chassis actuators assigned to the vehicle.

In block 209, the control logic, variables ST1 generated by controller 208 are converted into control signals for engine 210 and control signals for the actuators of the vehicle. The actuators are, for example, chassis actuators 211ixj with which the behavior of the chassis can be influenced and actuators 212ixj with which a braking force can be generated on the corresponding wheels. To control engine 210, control logic generates a signal mot1 with which the throttle valve setting of the engine, for example, can be influenced. To control chassis actuators 211ixj, control logic 209 generates signals Fsixj with which the attenuation or rigidity implemented by chassis actuators 211ixj can be influenced. To control actuators 212ixj, which are designed as brakes, in particular, control logic 209 generates signals Aixj with which the braking forces generated by actuators 212ixj on the corresponding wheels can be influenced. Control logic 209 generates variables ST2 which are sent to controller 208 and contain information about the control of the individual actuators.

With chassis actuators 211ixj, the chassis of the vehicle is influenced. In order for the controller to detect the actual status of chassis actuators 211ixj, signals Frixj are sent from chassis actuators 211ixj to controller 208.

Figure 2A:
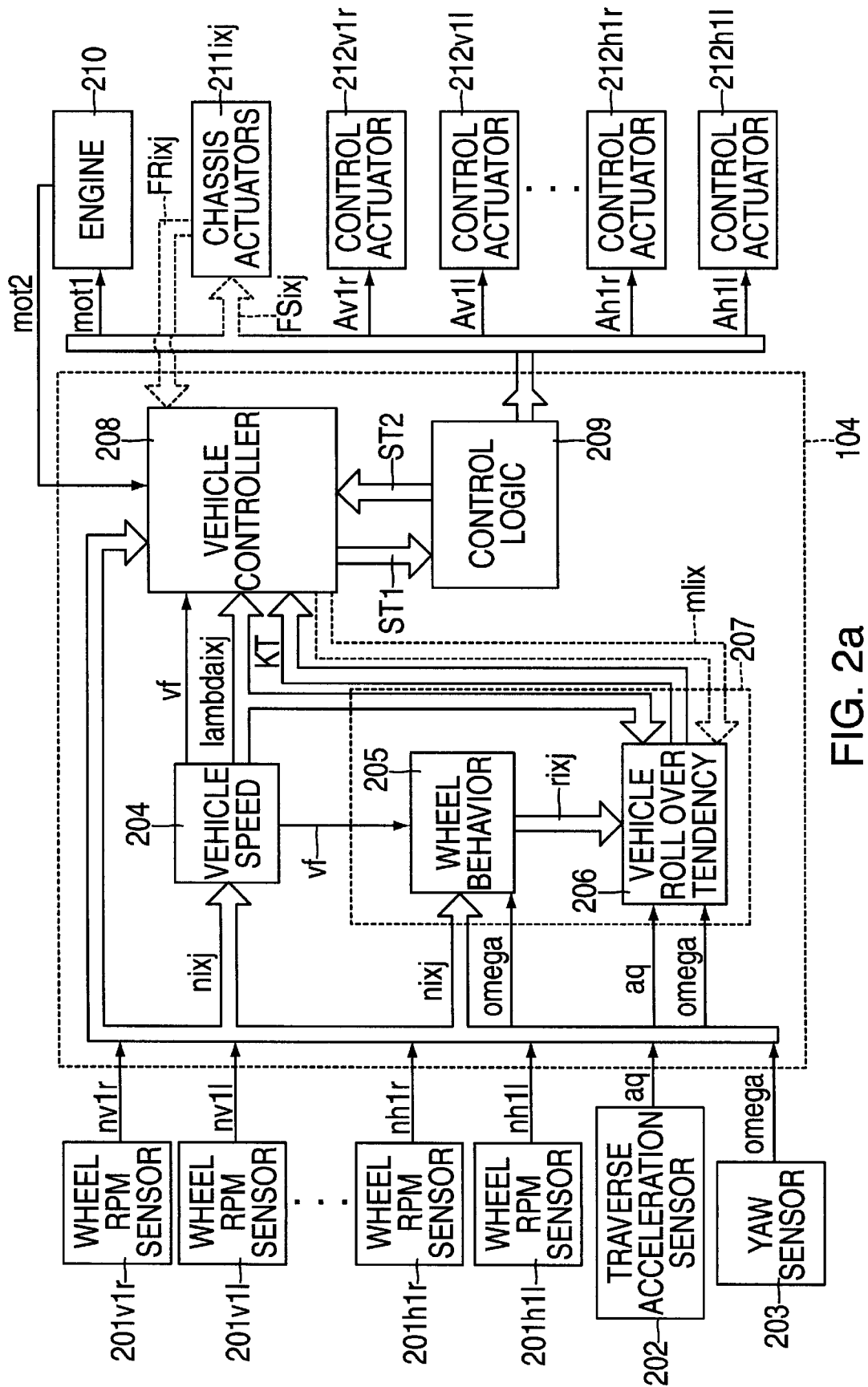
FIG. 2a shows a general arrangement of a device according to the present invention for the one-piece vehicle.

It should be pointed out here that it is also contemplated by the present invention to use retarders in addition to the actuators shown in FIG. 2a.

The brake system used in FIG. 2a may be a hydraulic or pneumatic or electrohydraulic or electropneumatic brake system.

A second embodiment based on the vehicle combination illustrated in FIG. 1b will be described now with the help of FIG. 2b. The description of the components illustrated in FIG. 2b is based on the description of FIG. 2a as much as possible.

Figure 2B:
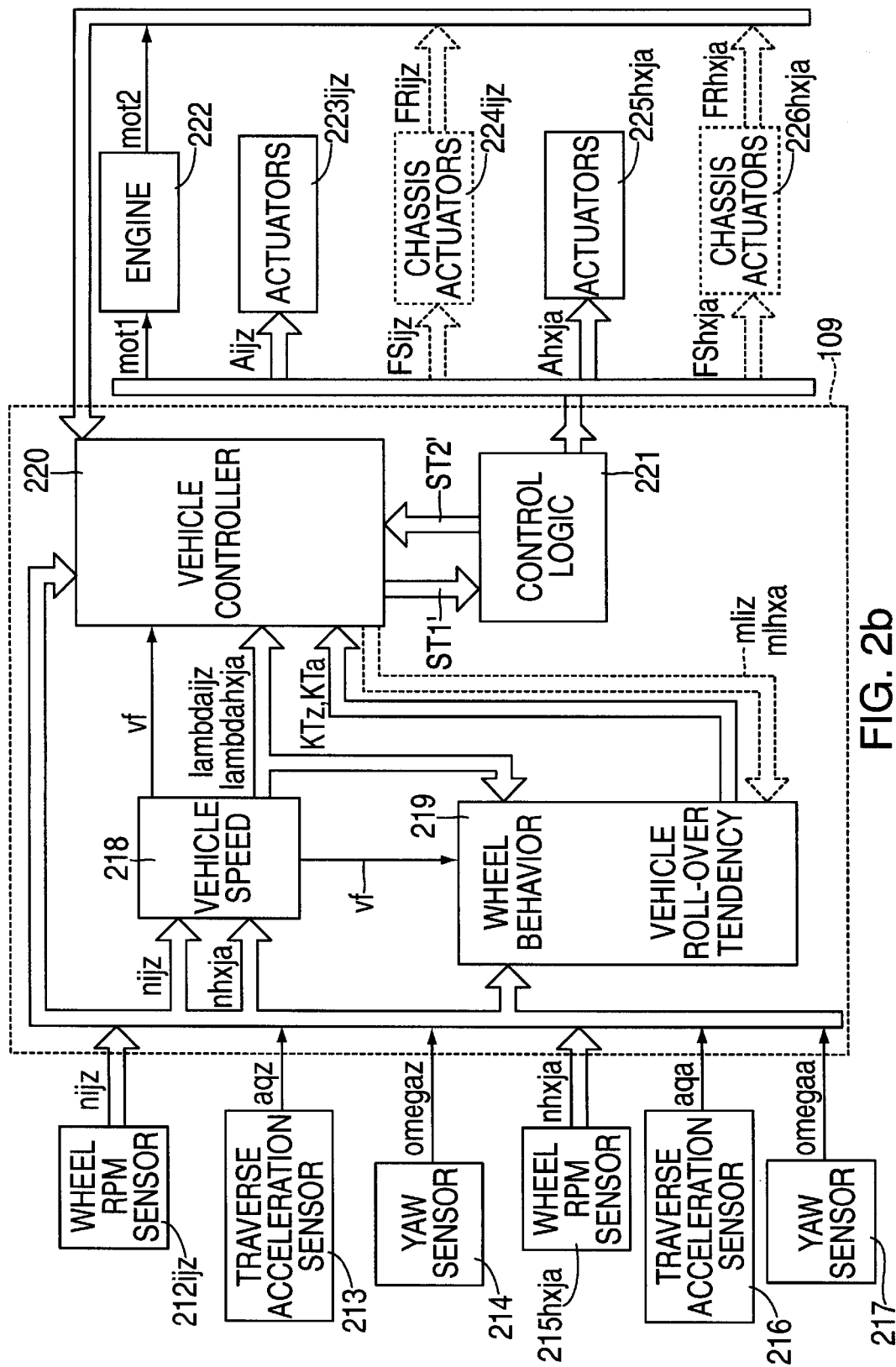
FIG. 2b shows the general arrangement of the device according to the present invention for the vehicle combination.

In FIG. 2b, tractor 105 is equipped with wheel rpm sensors 212ijz, a transverse acceleration sensor 213 and a yaw sensor 214. Trailer 106 should be equipped at least with wheel rpm sensors 215hxja. In addition, the trailer may also be equipped with a transverse acceleration sensor 216 and a yaw sensor 217. In the normal case, i.e., for a steady state of operation, transverse acceleration sensor 216 and yaw sensor 217 are not necessary for trailer 106, because the transverse acceleration acting on trailer 106 or the yaw acting on trailer 106 each correspond to the transverse acceleration or yaw acting on tractor 105. In the non-steady state of operation, both the transverse acceleration and the yaw of trailer 106 can be determined in a conventional manner from the wheel rpm of the trailer. For this reason, transverse acceleration sensor 216 as well as yaw sensor 217 are shown with dotted lines in FIG. 2b.

Block 218 corresponds in its function to block 204 shown in FIG. 2a. Block 219 corresponds in its function to blocks 205 and 206 which are combined to form block 207 in FIG. 2a. Block 220 corresponds in its function to block 208 shown in FIG. 2a. Block 221 corresponds in its function to block 209 shown in FIG. 2a. Variables nijz, aqz and omegaz determined for tractor 105 as described in conjunction with FIG. 2a are sent similarly to blocks 218, 219 and 220. On the basis of the diagram in FIG. 2a, with regard to the sensors, the sensors for trailer 106 are also to be taken into account. Variables nhxja, aqa and omegaa generated with the help of sensors 215hxja, 216 and 217 for the trailer 106 are processed in control unit 109 in a similar manner to variables nijz, aqz and omegaz generated for tractor 105. This means that variables nhxja are sent to block 218 as well as to block 220. If present, variables aqa and omegaa are sent to blocks 219 and 220.

A variable vf describing the speed of the vehicle combination is determined in block 218 from variables nijz and nhxja in accordance with that in block 204. This variable vf is sent to block 219 and/or block 220. Likewise, variables lambdaijz and lambdahxja are also determined in block 218 in a manner similar to that in block 204 and are sent to both block 219 and block 220. In block 219, according to the procedure in block 207, it is determined whether there is a roll-over tendency for the vehicle combination and/or tractor 105 and/or trailer 106. To do this, the dynamic running radii are determined in block 219 for the wheels of tractor 105 as well as for the wheels of trailer 106. The result of the determination of the roll-over tendency is relayed from block 219 to block 220 by variables KTz and KTa. Variable KTa contains information for tractor 105, and variable KTa contains information for the trailer.

According to the procedure described in conjunction with block 208, variables ST1' are determined in block 220 and sent to control logic 221. Likewise, axle-specific loads mliz of the tractor and axle-specific loads mlhxa of the trailer are determined in block 220 and sent to block 219. According to FIG. 2b, variables ST2' are determined in block 221 and sent to controller 220. On the basis of variables ST1' sent to block 221, control signals for the engine and control signals for the actuators are determined in block 221. In FIG. 2b, these are the following control signals for tractor 105: Control signal mot1 is determined for engine 222. Control signals Aijz are determined for actuators 223ijz with which braking forces can be generated. For any chassis actuators 224ijz assigned to the tractor, control signals Fsijz are determined. In addition, control signals Ahxja are determined in control logic 221 for actuators 225hxja which are provided in the trailer and with which braking forces can be generated. If the trailer has chassis actuators 226hxja, control signals Fshxja are determined in control logic 221 for the chassis actuators. In FIG. 2b, controller 220 receives a variable mot2 from engine 222, variables Frijz from chassis actuators 224ijz and variables Frhxja from chassis actuators 226hxja.

Figure 2C:
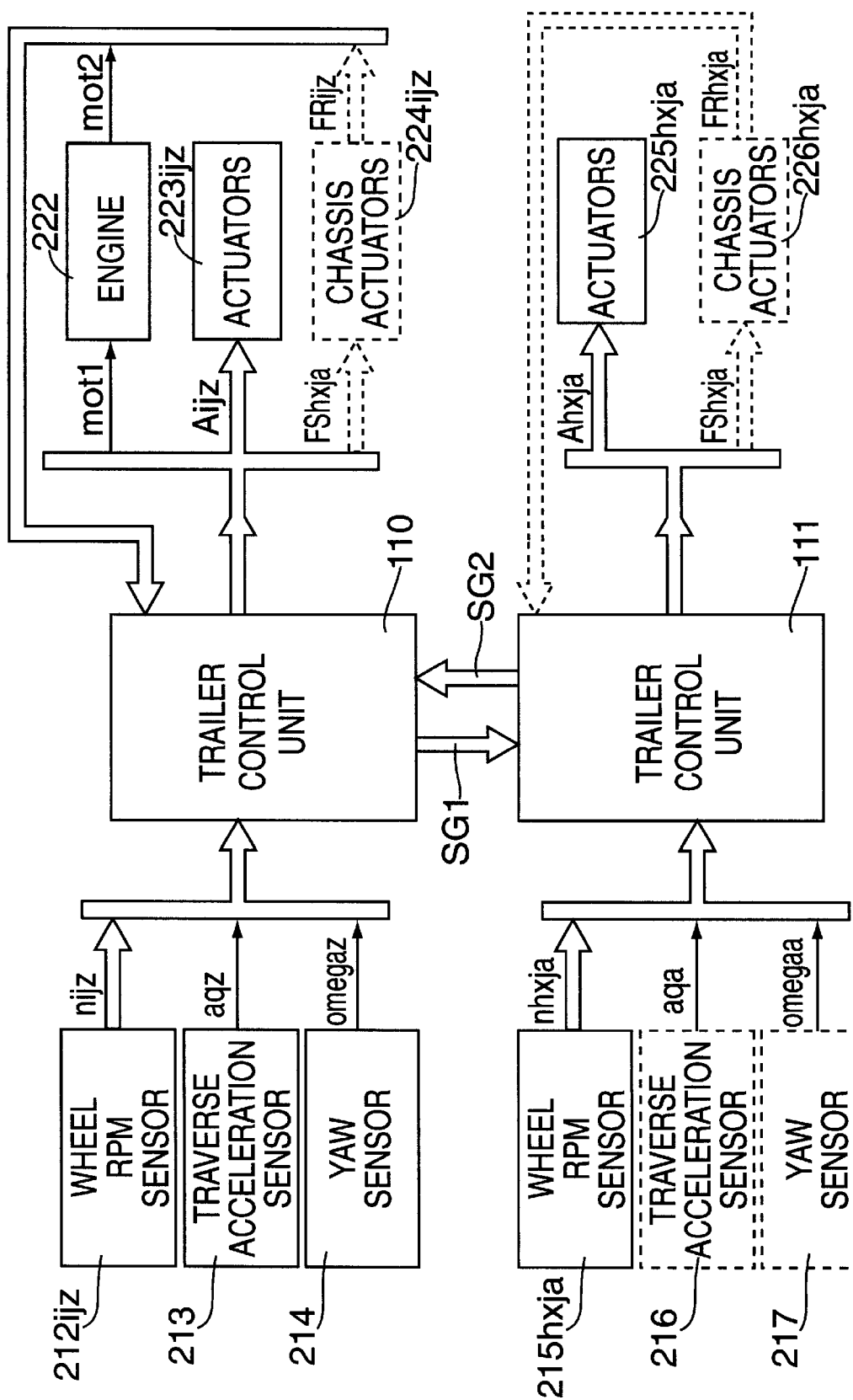
FIG. 2c shows the general arrangement of the device according to the present invention for the vehicle combination with two control devices.

With the help of FIG. 2c, a third embodiment according to the present invention is described based on the vehicle combination illustrated in FIG. 1c. In this embodiment, tractor 105 is equipped with a control unit 110 and trailer 106 is equipped with a control unit 111. It should be pointed out here that the function of components and the meaning of variables used in FIG. 2c and already explained in conjunction with FIG. 2b are similar. With regard to control units 110 and 111, supply of input variables or the output of output variables can be seen in FIGS. 2a and 2b. Control unit 110 corresponds to control unit 104 shown in FIG. 2a. To arrive at control unit 110, control unit 104 must be modified in controller 208 to the extent that it can also determine and output additional variables SG1 and can receive and process additional variables SG2. Control unit 111 can also be derived from control unit 104 in FIG. 2a. To do so, controller 208 must be modified to the extent that it can determine and output additional variables SG2, and can receive and process additional variables SG1. Since the trailer has as actuators only brakes 225hxja and chassis actuators 226hxja, controller 208 shown in FIG. 2a and/or control logic 209 must also be modified to this extent.

Since the vehicle combination has two separate control units 110 and 111, an exchange of information or variables SG1 and SG2 may assist in the coordination of the two control units to coordinate measures taken by the two control units. For example, through variables SG1 and SG2 it is possible to exchange information regarding which actuators are activated at a given time. As an alternative, however, it is also contemplated by the present invention for the two control units 110 and 111 to function autonomously. In this case, no exchange of information or variables SG1 or SG2 between the two control units is necessary.

Figure 3A:
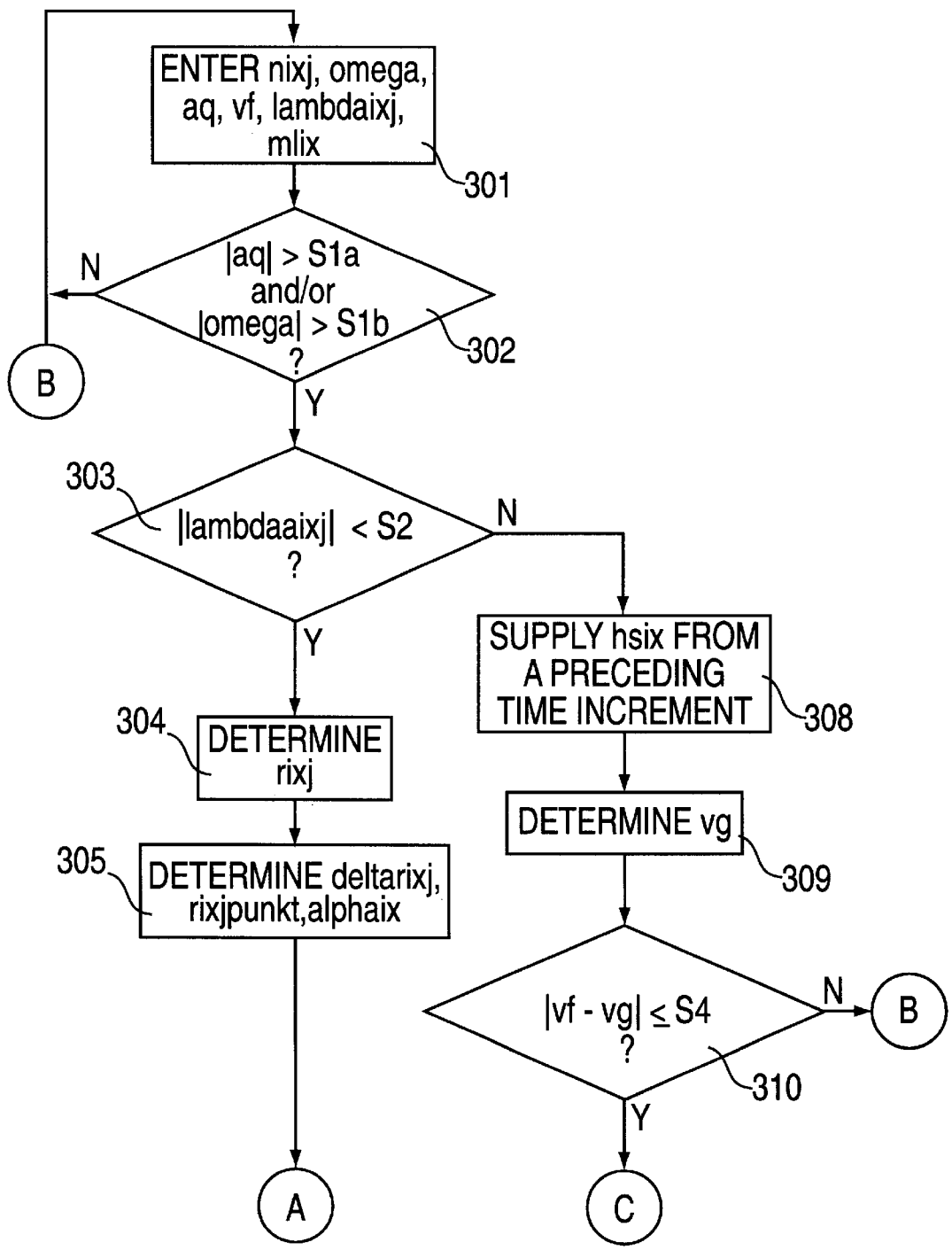
FIG. 3a shows a first part of a flowchart illustrating the method according to the present invention.
Figure 3B:
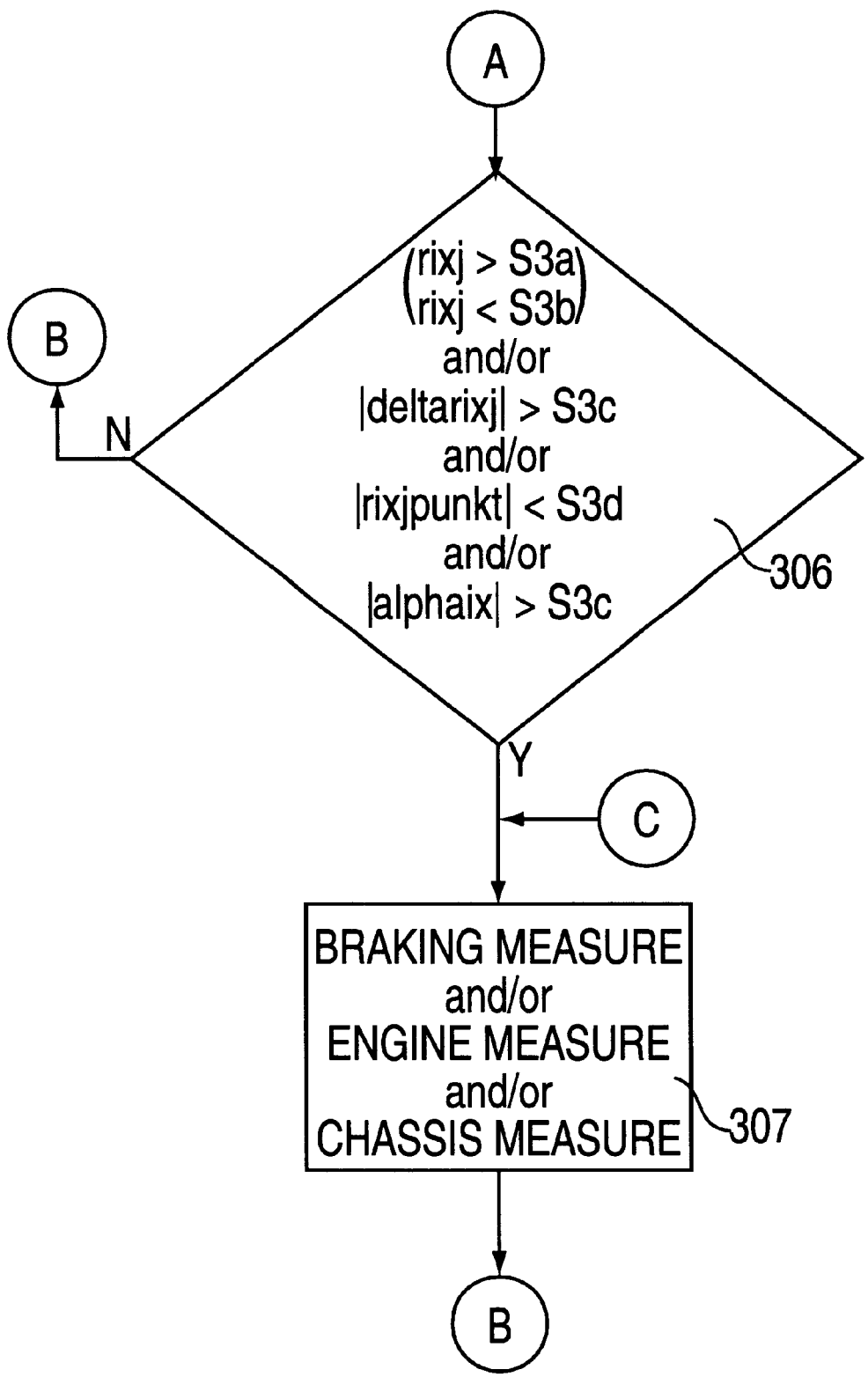
FIG. 3b shows a second part of a flowchart illustrating the method according to the present invention.

With the help of the flow chart illustrated in FIGS. 3a and 3b, the sequence of the method according to the present invention is to be illustrated. The flow chart in FIGS. 3a and 3b describes the sequence of the method according to the present invention as it would take place for a one-piece vehicle shown in FIG. 1a, which is used as the basis for the device according to the present invention as illustrated in FIG. 2a.

The method according to the present invention begins with a step 301 in which variables nixj, omega, aq, vf, lambdaixj and mlix are entered. A step 302 is carried out following step 301.

The method according to the present invention illustrated in FIGS. 3a and 3b takes place essentially in the two blocks 205 and 206 which are combined to form block 207.

The query performed in step 302 determines whether the condition of the vehicle is such that there may be a tendency of the vehicle to roll over about a vehicle axis oriented in the longitudinal direction of the vehicle. It is therefore determined in step 302 whether the absolute value of variable aq describing the transverse acceleration of the vehicle is greater than a first threshold value S1a and/or whether the absolute value of variable omega describing the yaw of the vehicle is greater than a second threshold value S1b.

The alternative linking of the two partial queries in step 302 has the following reasons: first, the case may occur that block 206 receives either variable aq describing the transverse acceleration or variable omega describing the yaw. In this case, only one of the two partial queries can be executed. Otherwise, the case may occur where both variables are sent to block 206. In this case, either one of the two partial queries can be carried out or both partial queries can be carried out at the same time to make the result more reliable. If at least one of the two partial queries is satisfied in step 302, then a step 303 is carried out following step 302. If, however, neither of the two partial queries is satisfied in step 302, step 301 is carried out again following step 302.

In step 303, the absolute value of variable lambdaixj describing the drive slip and/or wheel slip is compared with a threshold value S2. The query performed in step 303 is carried out for the following reason: the determination in step 304 of variables rixj, which represent the dynamic running radii of the wheels and describe the wheel behavior quantitatively, can only be carried out if the wheels are more or less free of slip, i.e., if the drive slip and/or wheel slip of the wheels is smaller than a predetermined threshold value. If this is not the case, variables rixj which describe the wheel behavior quantitatively cannot be determined without error.

If it is found in step 303 that the absolute value of variable lambdaixj is less than the corresponding threshold value, then a step 304 is carried out following step 303. However, if it is found in step 303 that the absolute value of the variable lambdaixj is greater than the corresponding threshold value S2, then a step 308 is carried out following step 303.

It should be pointed out here that the indexed representation used in the individual steps, e.g., lambdaixj, is intended to denote that the individual steps are to be carried out for any desired single wheel or any number of wheels or for all the wheels of the vehicle.

With the query performed in step 303, it is decided whether a first or second type of query is to be carried out to determine whether the vehicle has a tendency to roll over. If it is found in step 303 that the absolute value of the wheel slip is less than the corresponding threshold value, then a first type of determination which is composed of steps 304, 305 and 306 is carried out. If, however, it is found in step 303 that the absolute value of the wheel slip is greater than the threshold value, a second type of query composed of steps 308, 309 and 310 is carried out.

In step 304, the variables describing the wheel behavior quantitatively are determined with the help of the equation given above. These variables can be determined only if there is not much wheel slip, i.e., these variables can be determined only if there is not too great a difference between the wheel rpm and the vehicle speed. If the difference between the wheel rpm and the vehicle speed is too great, as is the case, for example, when individual wheels have a great slip, then faulty decisions may be made in step 306 because of variables rixj determined in this vehicle state. A step 305 is carried out following step 304. In step 305, variables deltarixj, rixjpunkt and alphaix are determined. Variable deltarixj is a difference derived from the instantaneous value, variable rixj describing the wheel behavior quantitatively and a value, the variable describing the wheel behavior quantitatively, which was determined when driving straight ahead.

The value corresponding to the variable describing the wheel behavior quantitatively when driving straight ahead is determined from time to time in suitable driving situations and is stored temporarily in a suitable memory.

Variable rixjpunkt is a variable representing the time characteristic of variable rixj, which describes the wheel behavior quantitatively. In particular, variable rixjpunkt corresponds to the time derivative of variable rixj. Variable alphaix is a variable describing the angle of inclination of a wheel axle. Variable alphaix is determined according to the equation:

$$alphaix = \left| \frac{rixl - rixr}{2 \cdot a} \right|$$

As this equation shows, a variable describing the inclination of the wheel axle is determined on the basis of the variables determined for the two wheels of the wheel axle, describing the wheel behavior quantitatively. In addition, wheel base $2a$ of the vehicle enters into variable alphaix. The above equation for angle of inclination alphaix represents an approximation which applies to small angles alphaix.

A step 306 is carried out following step 305. With the help of step 306, it is determined whether the vehicle has a tendency to roll over about a vehicle axis oriented in the longitudinal direction of the vehicle. The individual queries executed in step 306 are carried out using the variables determined in step 305, which are in turn determined as a function of the instantaneous value of variable rixj describing the wheel behavior quantitatively as determined in step 304. The presentation selected in step 306 is intended to express the following: either the method according to the present invention can be designed in such a way that in general only one of these four partial queries is implemented, or a portion of these partial queries is implemented, or all partial queries are implemented.

In a first partial query, it is determined whether the instantaneous value of variable rixj is greater than a first threshold value S3$a$. First threshold value S3$a$ is intended to represent the radius of the unloaded wheel. With the help of this query, it is consequently ascertained whether the dynamic running radius of a wheel of the vehicle is greater than that of an unloaded wheel due to the tendency of the vehicle to roll over. This query determines whether the wheels on the inside of the curve when turning are at risk of lifting. The first partial query contains another query with which it is ascertained whether the instantaneous value of variable rixj is smaller than a second threshold value S3$b$. This query includes wheels on the outside of the curve which are compressed greatly due to the tendency of the vehicle to roll over. Thus, with the help of the first partial query, the absolute variable of the dynamic running radius is compared with corresponding threshold values to detect a tendency of the vehicle to roll over. The vehicle has a tendency to roll over when either the dynamic running radius of a wheel on the inside of the curve is greater than threshold value S3$a$ or when the dynamic running radius of a wheel on the outside of the curve is smaller than threshold S3$b$.

In a second partial query, it is determined whether the absolute value of difference deltarixj is greater than a third threshold value S3$c$. With this query, the relative change in the dynamic running radius resulting when turning a corner after driving straight ahead is analyzed to detect whether the vehicle has a tendency to roll over. A vehicle has a tendency to roll over when the absolute value of the difference is greater than the corresponding threshold value S3$c$.

In a third partial query, it is determined whether the absolute value of variable rixjpunkt which describes the time characteristic of variable rixj describing the wheel behavior quantitatively is smaller than a fourth threshold value S3$d$. The vehicle has a tendency to roll over when the absolute value of the variable describing the time characteristic is smaller than a fourth threshold value S3$d$.

In a fourth partial query, it is ascertained whether the absolute value of variable alphaix describing the angle of inclination of a wheel axle is greater than a fifth threshold value S3$e$. The vehicle has a tendency to roll over when the absolute value of variable alphaix is greater than threshold value S3$e$.

With the help of the partial queries taking place in step 306, the tendency of a vehicle to roll over about a vehicle axis oriented in the longitudinal direction of the vehicle is detected when at least one of the four partial queries is satisfied. It should be pointed out here that it is also appropriate to perform in step 306 only the first partial query in combination with the third partial query or to perform the second partial query in combination with the third partial query, for example. If at least one of the partial queries is satisfied in step 306, i.e., if the vehicle has a tendency to roll over, then a step 307 is carried out following step 306. The output of variable KT taking place in block 206 when there is a roll-over tendency is not shown in FIGS. 3a and 3b. However, if none of the partial queries is satisfied in step 306, i.e., the vehicle does not have a roll-over tendency, then step 301 is carried out again following step 306.

As already indicated in conjunction with FIGS. 2a, 2b and 2c, suitable braking measures and/or engine measures and/or chassis measures are taken in step 307 to prevent the vehicle from rolling over about a vehicle axis oriented in the longitudinal direction of the vehicle. It should be pointed out here that the measures presented in step 307 are carried out in conjunction with the control logic on the basis of the vehicle controller when the vehicle controller is notified by variables KT and KTa or KTz that the vehicle has a tendency to roll over about a vehicle axis oriented in the longitudinal direction of the vehicle.

If it is found in step 303 that the absolute value of variable lambdaixj is greater than the corresponding threshold value S2, then the first type of determination cannot be used because faulty decisions would be made in step 306 because of the excessive slip values and the resulting error in determination of variables rixj describing the wheel behavior quantitatively. Therefore, if the absolute value of variable lambdaixj is greater than threshold value S2, a step 308 is carried out following step 303, initiating a second type of determination of whether the vehicle has a tendency to roll over. This second type of determination is performed as a function of the variable determined for at least one wheel in a preceding time increment, describing the wheel behavior quantitatively. A variable hsix describing the height of the center of gravity of the vehicle, in particular, an axle-specific center of gravity height, is supplied in step 308. To do this, variable hsix, for example, which was determined for a preceding time increment when the query performed in step 303 was satisfied and which was stored temporarily is entered. As an alternative, variable hsix may be determined as a function of variables rixj, which were determined for a preceding time increment when the query taking place in step 303 was satisfied and which were stored temporarily. Axle-specific height hsix of the center of gravity is generally determined according to the equation:

$$hsix = \frac{C \cdot a^2}{mlix \cdot aq} \cdot alphaix$$

In this equation, variable C represents the resulting vertical rigidity of the wheels assigned to the wheel axle, variable a corresponds to half the wheel base of the wheel axle, variable alphaix corresponds to the angle of inclination of the wheel axle with respect to the road surface, variable mlix corresponds to the load acting on the wheel axle, and variable aq corresponds to the transverse acceleration acting on the vehicle. This uses variables mlix, aq and alphaix from the time increment when the query taking place in step 303 was still satisfied, for example. In this case, it means that variable mlix, variable aq and variable alphaix or variables rixj which are needed to determine variable alphaix must be saved in a buffer memory on an ongoing basis. A step 309 is carried out following step 308.

In step 309, a speed limit value is determined for cornering by the vehicle in a conventional manner on the basis of the variable hsix describing the height of the center of gravity of the vehicle. The speed limit value indicates the speed of the vehicle at which the vehicle cannot be expected to roll over about a vehicle axis oriented in the longitudinal direction of the vehicle. To determine the speed limit value as a function of the variable describing the height of the center of gravity of the vehicle, reference is made, for example, to the formula given on page 346 of Kraftfahrtechnisches Taschenbuch, VDI Verlag, $21^{st}$ edition. A step 310 is carried out following step 309. In step 310, it is ascertained whether the absolute value of the difference between the vehicle speed and the speed limit value is less than or equal to a threshold value S4. If the absolute value of the difference is less than or equal to threshold value S4, then the vehicle has a tendency to roll over about a vehicle axis oriented in the longitudinal direction of the vehicle, and then step 307 is carried out following step 310. However, if the absolute value of the difference is greater than threshold value S4, which is equivalent to the vehicle not having a tendency to roll over, then step 301 is carried out following step 310.

The fact that only a one-piece vehicle is illustrated in FIGS. 3a and 3b is not intended to restrict the scope of the present invention in any way. The flow chart shown in FIGS. 3a and 3b can also be used accordingly for a vehicle combination.

Figure 4:
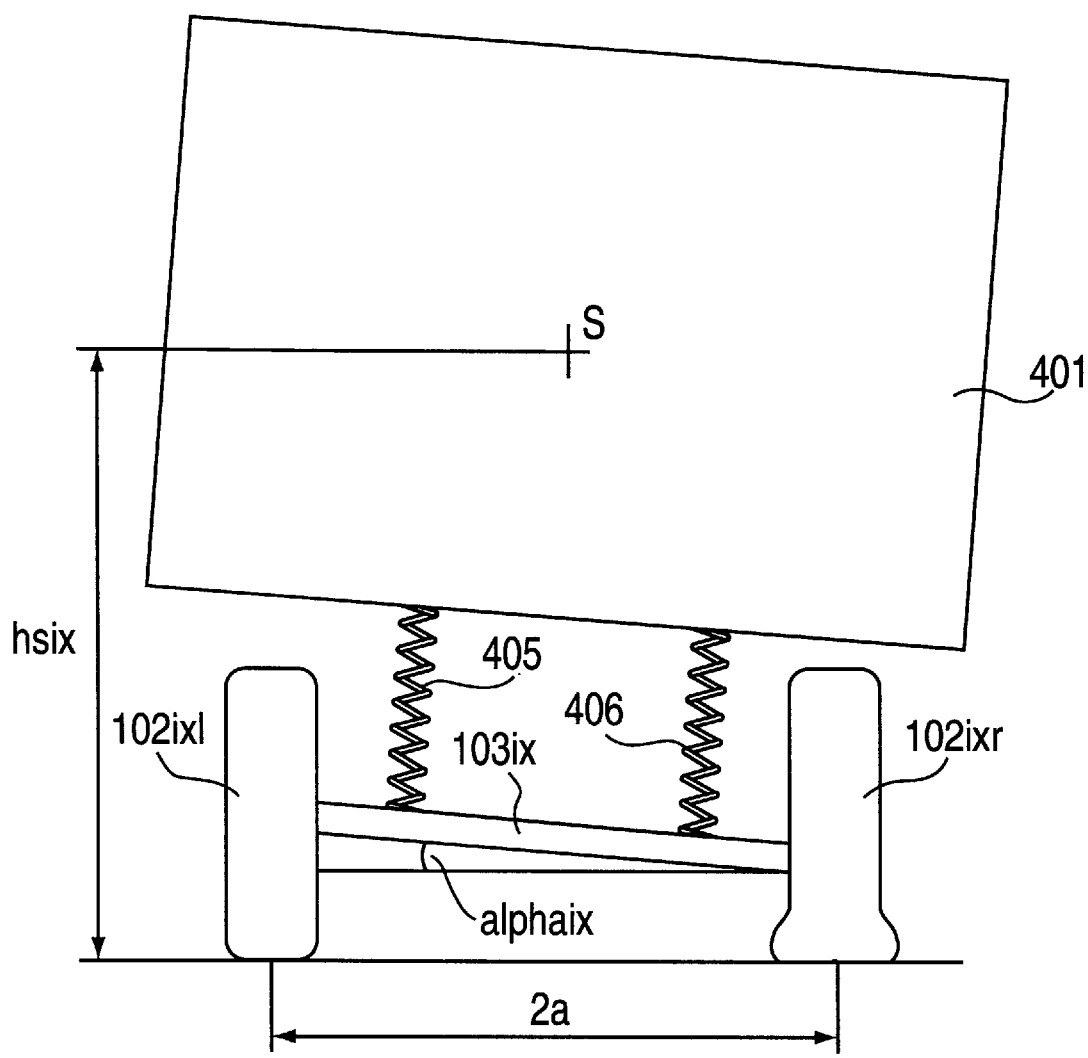
FIG. 4 shows a schematic illustrating physical conditions for a vehicle when cornering according to the present invention.

In conclusion, with the help of FIG. 4, the physical state of affairs on which the method according to the present invention is based is to be explained. FIG. 4 shows a schematic diagram of a one-piece vehicle such as that illustrated in FIG. 1a. However, this is not intended to restrict the scope of the present invention in any way.

FIG. 4 shows a wheel axle 103ix with respective wheels 102ixl and 102ixr. Furthermore, vehicle body 401 which is attached to wheel axle 103ix by suspension devices 405 and 406 is also shown. FIG. 4 shows wheel base 2a of the vehicle. Furthermore, axle-specific center of gravity S and respective axle-specific height hsix of the center of gravity are also shown. Likewise, angle of inclination alphaix of the wheel axle with respect to the road surface is also shown. The vehicle is turning left.

As FIG. 4 shows, load shifts occur when turning a corner, the load on wheel 102ixl on the inside of the curve is reduced and in extreme situations it may lose contact with the ground. It does not matter here whether the turn is on a flat or inclined road surface. Wheel 102ixr on the outside of the curve is under a greater load. Due to this load shift at the individual wheels, the respective dynamic running radius rixj changes. Consequently, these changes can be used to detect a wheel lifting up from the road surface, which in turn can be used to detect a tendency of a vehicle to roll over about a vehicle axis oriented in the longitudinal direction of the vehicle.

In conclusion, it should be pointed out that the form of the embodiment selected for the description and the illustrations in the drawings should not restrict the scope of the present invention in any way.

What is claimed is:

1. A method for detecting a tendency of a vehicle to roll over about a vehicle axis, the vehicle axis being oriented in a longitudinal direction of the vehicle, the method comprising the steps of:

(a) determining, for at least one wheel, a variable describing a wheel rpm;

(b) determining at least one variable representing transverse dynamics of the vehicle;

(c) determining, for the at least one wheel, a variable describing quantitatively a wheel behavior, the variable describing quantitatively the wheel behavior being a function of (1) the variable describing the wheel rpm for a corresponding wheel of the at least one wheel and (2) the at least one variable representing the transverse dynamics of the vehicle; and (d) determining whether the vehicle has the tendency to roll over about the vehicle axis as a function of at least the variable describing quantitatively the wheel behavior of at least one of the at least one wheel.

2. The method according to claim 1, wherein the method is used for stabilizing the vehicle and wherein, if the vehicle is determined to have the tendency to roll over, then, in order to stabilize the vehicle, at least one of a braking measure at the at least one wheel, an engine measure and a measure involving chassis actuators is taken.

3. The method according to claim 2, wherein the stabilizing of the vehicle includes preventing the vehicle from rolling over.

4. The method according to claim 1, wherein the step of determining, for a respective wheel of the at least one wheel, the variable describing quantitatively the wheel behavior includes the step of determining a variable describing a wheel load acting on the respective wheel.

5. The method according to claim 1, wherein the step of determining the variable describing quantitatively the wheel behavior includes the step of determining the variable describing quantitatively the wheel behavior as a function of at least one of the variable describing the wheel rpm for the corresponding wheel and a variable describing a vehicle speed, and at least one of the variable representing the transverse dynamics of the vehicle and a variable describing a vehicle geometry.

6. The method according to claim 5, wherein the at least one variable representing the transverse dynamics of the vehicle is a function of at least one of a variable describing a transverse acceleration of the vehicle and a variable describing a yaw of the vehicle, and wherein the variable describing the vehicle speed is a function of the variable describing the wheel rpm.

7. The method according to claim 1, wherein the vehicle has the tendency to roll over when at least one of the following occurs:

the variable, for the at least one wheel, describing quantitatively the wheel behavior is greater than a first threshold value;

the variable, for the at least one wheel, describing quantitatively the wheel behavior is smaller than a second threshold value;

an absolute value of a difference between the variable, for the at least one wheel, describing quantitatively the wheel behavior and a comparison value is greater than a third threshold value;

an absolute value of a variable describing a time characteristic of the variable, for the at least one wheel, describing quantitatively the wheel behavior is smaller than a fourth threshold value; and an absolute value of a variable describing an angle of inclination of a particular wheel axle is greater than a fifth threshold value, the variable describing the angle of inclination being a function of at least the respective variable describing quantitatively the wheel behavior for each wheel of the at least one wheel on the particular wheel axle.

8. A device for detecting a tendency of a vehicle to roll over about a vehicle axis, the vehicle axis being oriented in a longitudinal direction of the vehicle, comprising:

first means for determining a variable describing a wheel rpm for at least one wheel;

second means for determining at least one variable representing transverse dynamics of the vehicle;

third means for determining, for the at least one wheel, a variable describing quantitatively a wheel behavior, the variable describing quantitatively the wheel behavior being a function of the variable determined by the first means for a corresponding wheel and the at least one variable determined by the second means; and fourth means for determining whether the vehicle has the tendency to roll over about the vehicle axis as a function of at least the variable determined by the third means for the at least one wheel.

9. The device according to claim 8, wherein the device is used for stabilizing the vehicle and wherein, if the vehicle has the tendency to roll over, then, in order to stabilize the vehicle, at least one measure is taken at the at least one wheel including activating at least one of (A) at least one actuator associated with the at least one wheel, (B) means for influencing a torque delivered by an engine and (C) at least one actuator associated with a chassis.

10. The device according to claim 9, wherein the stabilizing of the vehicle includes preventing the vehicle from rolling over.

11. A method for detecting a tendency of a vehicle to roll over about a vehicle axis, the vehicle axis being oriented in a longitudinal direction of the vehicle, the method comprising the steps of:

(a) determining, for at least one wheel, a variable describing a wheel rpm;

(b) determining at least one variable representing transverse dynamics of the vehicle;

(c) determining, for the at least one wheel, a variable describing quantitatively a wheel behavior, the variable describing quantitatively the wheel behavior being a function of (1) the variable describing the wheel rpm for a corresponding wheel of the at least one wheel and (2) the at least one variable representing the transverse dynamics of the vehicle; and (d) determining whether the vehicle has the tendency to roll over about the vehicle axis as a function of at least the variable describing quantitatively the wheel behavior of at least one of the at least one wheel, wherein the step of determining whether the vehicle has the tendency to roll over includes the steps of:

comparing an absolute value of one of the at least one variable representing the transverse dynamics of the vehicle to a threshold value; and performing the determination of whether the vehicle has the tendency to roll over when the absolute value is greater than the threshold value.

12. The method according to claim 11, wherein the absolute value of one of the at least one variable representing the transverse dynamics of the vehicle includes an absolute value of at least one of a variable describing a transverse acceleration and a variable describing a yaw of the vehicle.

13. A method for detecting a tendency of a vehicle to roll over about a vehicle axis, the vehicle axis being oriented in a longitudinal direction of the vehicle, the method comprising the steps of:

(a) determining, for at least one wheel, a variable describing a wheel rpm;

(b) determining at least one variable representing transverse dynamics of the vehicle;

(c) determining, for the at least one wheel, a variable describing quantitatively a wheel behavior, the variable describing quantitatively the wheel behavior being a function of (1) the variable describing the wheel rpm for a corresponding wheel of the at least one wheel and (2) the at least one variable representing the transverse dynamics of the vehicle; and (d) determining whether the vehicle has the tendency to roll over about the vehicle axis as a function of at least the variable describing quantitatively the wheel behavior of at least one of the at least one wheel, wherein the step of determining whether the vehicle has the tendency to roll over includes the steps of:

determining a variable describing at least one of a drive slip and a wheel slip prevailing at a particular wheel of the at least one wheel;

comparing an absolute value of the variable describing at least one of the drive slip and the wheel slip to a corresponding threshold value; and performing the determination of whether the vehicle has the tendency to roll over as a function of the comparing.

14. The method according to claim 13, wherein the performing of the determination includes at least one of the following steps:

performing a first kind of determination of whether the vehicle has the tendency to roll over if the absolute value of the variable describing at least one of the drive slip and the wheel slip prevailing at the particular wheel is smaller than the corresponding threshold value, the first kind of determination being a function of at least the variable describing quantitatively the wheel behavior for at least the particular wheel in an instantaneous time increment; and performing a second kind of determination of whether the vehicle has the tendency to roll over if the absolute value of the variable describing at least one of the drive slip and the wheel slip prevailing at the particular wheel is not smaller than the corresponding threshold value, the second kind of determination being a function of at least the variable describing quantitatively the wheel behavior for at least the particular wheel in a preceding time increment.

15. A method for detecting a tendency of a vehicle to roll over about a vehicle axis, the vehicle axis being oriented in a longitudinal direction of the vehicle, the method comprising the steps of:

(a) determining, for at least one wheel, a variable describing a wheel rpm;

(b) determining at least one variable representing transverse dynamics of the vehicle;

(c) determining, for the at least one wheel, a variable describing quantitatively a wheel behavior, the variable describing quantitatively the wheel behavior being a function of (1) the variable describing the wheel rpm for a corresponding wheel of the at least one wheel and (2) the at least one variable representing the transverse dynamics of the vehicle, wherein the step of determining for a respective wheel of the at least one wheel, the variable describing quantitatively the wheel behavior includes a step of determining a variable describing a wheel load acting on the respective wheel and a step of determining a variable describing at least one of a diameter and a radius of the respective wheel; and (d) determining whether the vehicle has the tendency to roll over about the vehicle axis as a function of at least the variable describing quantitatively the wheel behavior of at least one of the at least one wheel.

16. A method for detecting a tendency of a vehicle to roll over about a vehicle axis, the vehicle axis being oriented in a longitudinal direction of the vehicle, the method comprising the steps of:

(a) determining, for at least one wheel, a variable describing a wheel rpm;

(b) determining at least one variable representing transverse dynamics of the vehicle;

(c) determining, for the at least one wheel, a variable describing quantitatively a wheel behavior, the variable describing quantitatively the wheel behavior being a function of (1) the variable describing the wheel rpm for a corresponding wheel of the at least one wheel and (2) the at least one variable representing the transverse dynamics of the vehicle; and (d) determining whether the vehicle has the tendency to roll over about the vehicle axis as a function of at least the variable describing quantitatively the wheel behavior of at least one of the at least one wheel, wherein the vehicle has the tendency to roll over when an absolute value of a difference between a variable describing a vehicle speed and a speed limit value is smaller than a corresponding threshold value.

17. The method according to claim 16, wherein the speed limit value is a function of at least a variable describing a height of a center of gravity of the vehicle and wherein the variable describing the height of the center of gravity of the vehicle is a function of the variable describing quantitatively the wheel behavior for the at least one wheel.

\* \* \* \* \*